US008949383B1

(12) United States Patent
Cometto et al.

(10) Patent No.: US 8,949,383 B1
(45) Date of Patent: Feb. 3, 2015

(54) VOLUME HIERARCHY DOWNLOAD IN A STORAGE AREA NETWORK

(75) Inventors: Maurilio Cometto, Fremont, CA (US);
Roy D'Cruz, Sunnyvale, CA (US);
Arindam Paul, Sunnyvale, CA (US);
Siva Ramineni, San Jose, CA (US);
Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1574 days.

(21) Appl. No.: 11/603,508

(22) Filed: Nov. 21, 2006

(51) Int. Cl.
*G06F 15/16* (2006.01)

(52) U.S. Cl.
USPC ........... 709/220; 709/212; 709/213; 709/235; 709/219

(58) Field of Classification Search
USPC .......................................... 709/212, 213, 238
See application file for complete search history.

(56) References Cited

U.S. PATENT DOCUMENTS

| 6,119,118 | A * | 9/2000 | Kain et al. ..................... 707/822 |
| 6,144,999 | A * | 11/2000 | Khalidi et al. ................. 709/219 |
| 7,770,059 | B1 * | 8/2010 | Glade et al. ...................... 714/7 |
| 2003/0163729 | A1 * | 8/2003 | Buchegger .................... 713/201 |
| 2005/0108375 | A1 * | 5/2005 | Hallak-Stamler ............. 709/223 |
| 2006/0005074 | A1 * | 1/2006 | Yanai et al. ...................... 714/5 |
| 2006/0090048 | A1 * | 4/2006 | Okumoto et al. ............. 711/162 |
| 2006/0161518 | A1 * | 7/2006 | Lacapra ............................ 707/2 |
| 2007/0014279 | A1 * | 1/2007 | Wang et al. ................... 370/351 |
| 2007/0277011 | A1 * | 11/2007 | Tanaka et al. ................. 711/162 |
| 2008/0072000 | A1 * | 3/2008 | Osaki et al. ................... 711/162 |
| 2010/0095060 | A1 * | 4/2010 | Strange et al. ................ 711/114 |
| 2011/0087696 | A1 * | 4/2011 | Lacapra ........................ 707/769 |

OTHER PUBLICATIONS

Mellor, "FAIS facts, What is FAIS About and What Will It Provide?", www.techworld.com/storage/features/index.cfm?FeatureID=1264, downloaded Nov. 21, 2006.
INCITS xxx-200x Fabric Application Interface Standard Rev. 0.5 Jul. 2005.

* cited by examiner

*Primary Examiner* — Djenane Bayard

(57) ABSTRACT

In one embodiment, a solution is provided wherein a volume hierarchy may be received at a network device in a storage area network. Once the network device is ready to apply the volume hierarchy, a message so indicating may be sent. Later, a command to apply the volume hierarchy may be received and the volume hierarchy may be applied so that the network device processes IOs using the volume hierarchy.

38 Claims, 10 Drawing Sheets

Initiators FIG. 3 Targets

US 8,949,383 B1

VOLUME HIERARCHY DOWNLOAD IN A STORAGE AREA NETWORK

BACKGROUND

1. Technical Field

The present disclosure relates to storage area networks.

2. Description of the Related Art

Storage Area Networks (SANs) are computer systems in which large mass storage devices such as Redundant Array of Independent Disks (RAID) devices are connected to a central processor or processors via high-speed network technology (as opposed to, for example, via a system bus). SANs are increasingly used to store vast amounts of information and their usage has grown exponentially with the rise of the Internet.

Virtualization of the storage area network allows for the organization of the physical devices to be hidden from users. For example, a company may create a volume hierarchy that allows the user to navigate though a virtual storage device. This hierarchy may include a series of folders and subfolders. In reality, however, the information in these folders and subfolders may be distributed among many different storage devices. The user may have no idea how the information is physically stored and may simply rely on the volume hierarchy.

DESCRIPTION OF EXAMPLE EMBODIMENTS

Overview

In one embodiment, a solution is provided wherein a volume hierarchy may be received at a network device in a storage area network. Once the network device is ready to apply the volume hierarchy, a message so indicating may be sent. Later, a command to apply the volume hierarchy may be received and the volume hierarchy may be applied so that the network device processes IOs using the volume hierarchy.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

The input and output from and to hosts and storages in a SAN are known collectively as the SAN's exchange, or flow. The exchange is typically measured in Input/Outputs (IOs). Traditionally, each input or output was sent by a host and terminated at a storage, or vice-versa. This is because the application that would be transmitting or interpreting the IO was located at either a host or a storage. Since the present invention describes moving the application to the switch, in an embodiment of the present invention IOs may be terminated at the switch (or some other located in between the host and the storage). It should be noted that the term "storage" as used throughout this document shall refer to either a single storage device or a group of storage devices.

Figure 1:
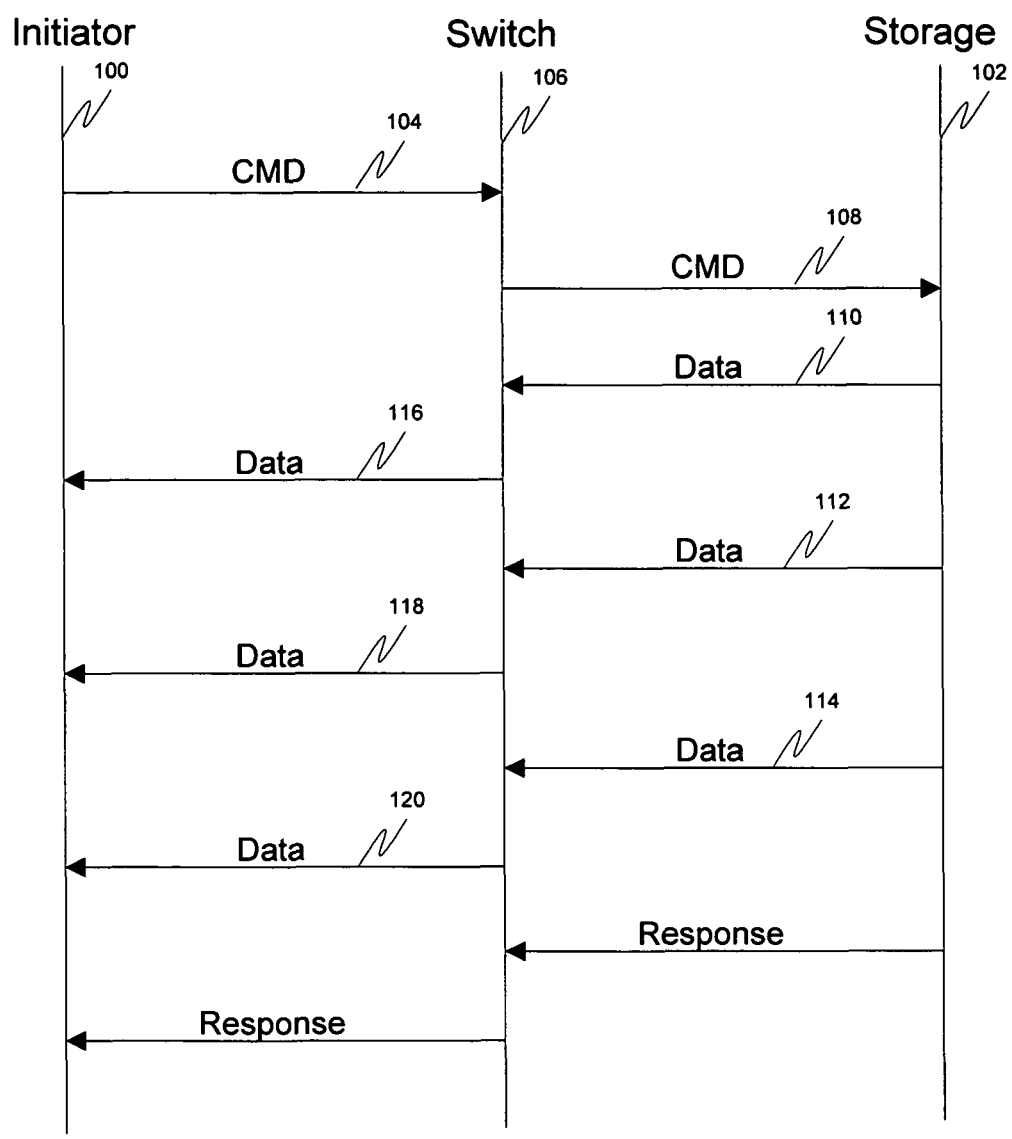
FIG. 1 illustrates an example of a command executed in a Storage Area Network.

FIG. 1 illustrates an example of a command executed in a SAN. The command in this figure is a read request. Rather than communications occurring directly between initiator 100 and storage 102, the command 104 may first be terminated at the switch 106. The switch 106 then may perform one or more processes on the commands, and then may generate a resulting command 108 for communication to the storage 104. The same is true of data messages 110, 112, 114, which may then be terminated at the switch 106, where processes may be performed upon them prior to the data 116, 118, 120 being replayed to the initiator 100.

In one embodiment of the present invention, customized hardware may be utilized that is compatible with a standard switch. Such an embodiment avoids the necessity of modifying the switch itself. This hardware may be known as a storage services module (SSM), which may be a blade that plugs into the switch and comprises hardware and software. Alternative embodiments are possible where the switch itself is utilized, or where alternative hardware and/or software is utilized.

Figure 2:
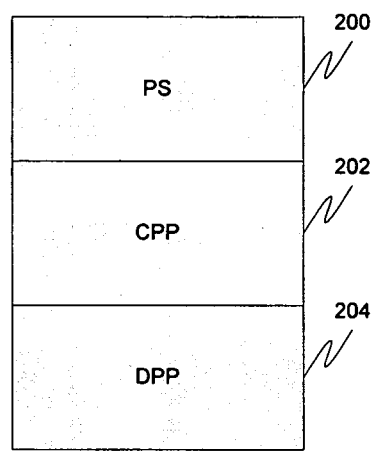
FIG. 2 illustrates an example software stack.

In an embodiment of the present invention, the software utilized may be split into three separate parts. FIG. 2 illustrates an example software stack. Partner Software (PS) layer 200 may include the underlying application to be run. A Control Path Processor (CPP) layer 202 may control the software and hardware. A Data Path Processor (DPP) layer 204 may be where the application processes themselves may be executed. Each DPP essentially represents a single processor or core in a multi-processor or multi-core environment.

One common protocol used to communicate within a SAN is the Small Computing System Interface (SCSI). Hosts can communicate at high speed via the SCSI protocol by utilizing Fibre Channel (FC) switching technology. Recent advancements have allowed such communications to occur at up to 10 Gb/s using 10 Gb/s FC or the 10 Gig Ethernet standards. It would be advantageous, therefore, for the complex virtualization functions performed by SAN switches to also be performed at 10 Gb/s, lest a bottleneck be created. Unfortunately, the single processor architecture that is common in most switches is not a viable solution for these levels of line speeds. For such speeds, multi-processor or multi-core processor technology may be utilized.

Figure 3:
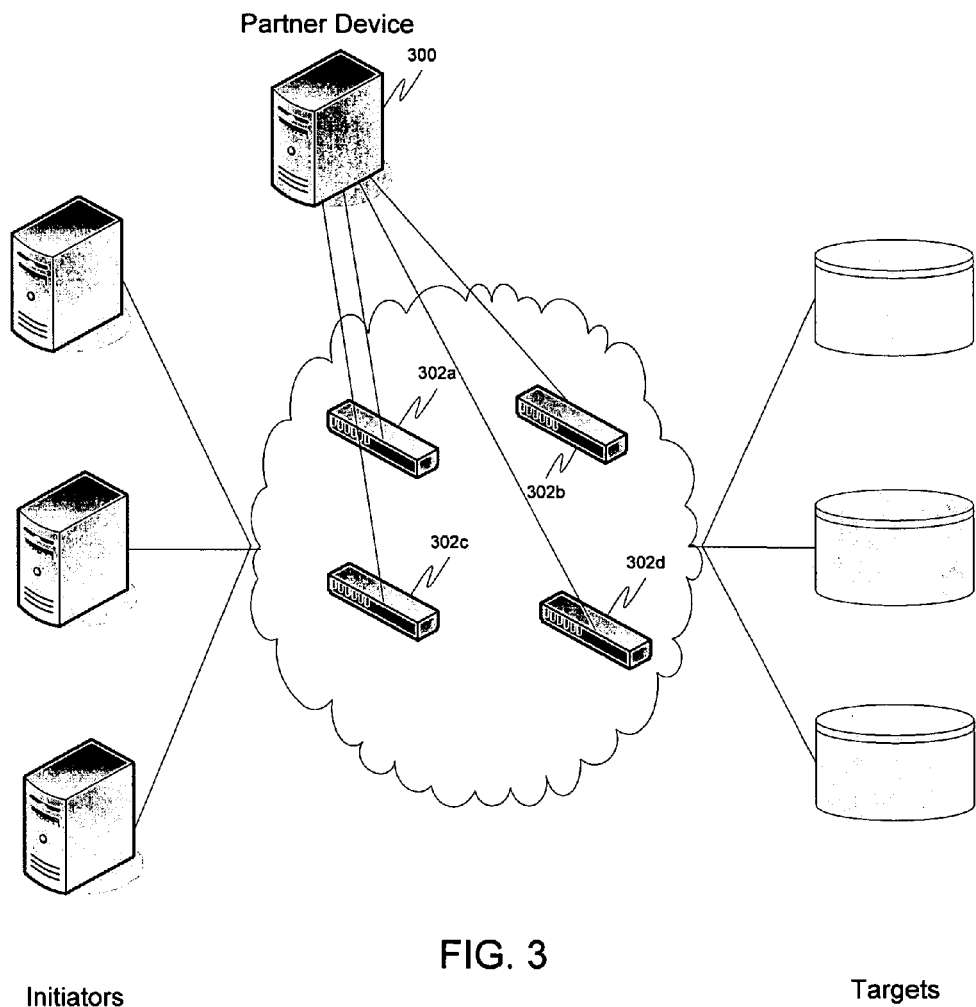
FIG. 3 illustrates an example storage area network.

The volume hierarchy describing a virtual storage device may be stored on multiple switches throughout the storage area network. This is depicted in FIG. 3. An example volume hierarchy is described later in this document. A company may create the hierarchy using a partner device 300 and download it to each of switches 302a-302d. This may include, for example, loading the volume hierarchies into multiple SSMs in the network. This can create several challenges, however that also can be addressed by various embodiments of the present invention.

One of these challenges is that a new hierarchy download may contain significant changes in the layouts of volumes on which IOs are currently being executed. Certain embodiments of the present invention can seamlessly apply these new changes without causing data corruption.

Another of the challenges is that the volume hierarchy may be downloaded to many different SSMs throughout what may be a large network. This can be time consuming, and during the time when the hierarchy is being downloaded, there may be some SSMs that will continue to have the old volume hierarchy while others have the new hierarchy. Thus, the shared volume is rendered a highly inconsistent state throughout the network as different SSMs may potentially virtualized host IOs to the shared volume entirely differently. Certain embodiments of the present invention help ensure that IOs are processed consistently, or at least as consistently as an administrator or partner desires.

Another of the challenges is that some downloads may fail, due to several reasons, such as data corruption during the download or an SSM running out of memory. Leaving a partially downloaded or corrupted volume hierarchy on a network device may also render the shared volume a highly inconsistent state. Certain embodiments of the present invention help prevent or clean up such situations.

Another of the challenges is that volume hierarchies can be large and complicated. Therefore, any attempt to run expensive "sanity" checks on the downloaded hierarchies to ensure the proper functioning of the system may lead to unacceptably long "down time" outages if network devices are shut down during such checks. Certain embodiments of the present invention help to reduce such down times.

Figure 4:
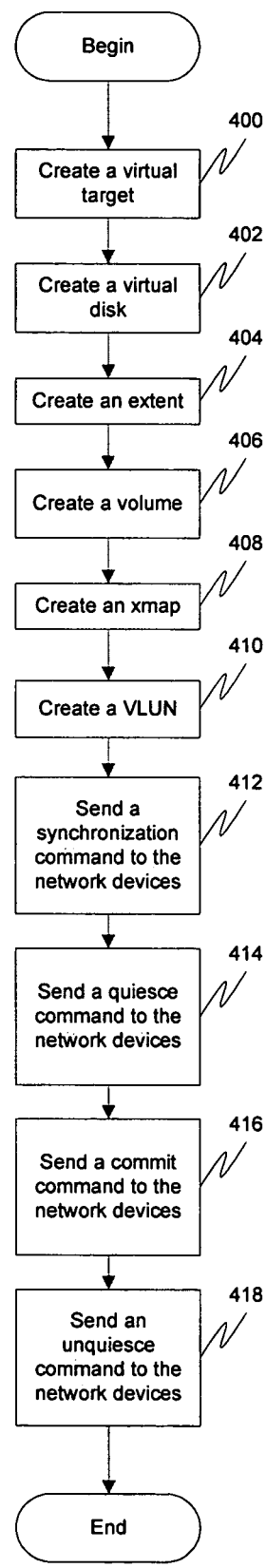
FIG. 4 is an example of a method for downloading a volume hierarchy to network devices in a storage area network in accordance with an embodiment of the present invention.

FIG. 4 is an example of a method for downloading a volume hierarchy to network devices in a storage area network in accordance with an embodiment of the present invention. It should be noted that this is merely one example of such a method, and many other embodiments are possible as many of the details described in the example are not fundamental to the invention. This process may be executed at a partner device. At 400, a virtual target may be created. At 402, a virtual disk may be created. This virtual disk may include the real target information. At 404, an extent, which may point to the virtual disk, may be created. At 406, a volume may be created, which points to the extent. At 408, an xmap may be created, which points to the volume. At 410, a virtual logic unit number (VLUN) may be created, which associates the virtual target and the xmap. At 412, a synchronization command may be sent to the network devices. This synchronization command may include the virtual target and the VLUN, and may indicate to the network devices that they should take the corresponding volume hierarchy and store it. At 414, a quiesce command may be sent to the network devices. The quiesce command indicates to the network devices that they should halt processing IOs. At 416, a commit command may be sent to the network devices. The commit command may include the virtual target and the VLUN, and may indicate to the network devices that they should take the stored hierarchy and make it active (i.e., begin using the newly downloaded volume hierarchy in liue of any older ones that it may have been using). At 418, an unquiesce command may be sent to the network devices. The unqiuesce command indicates to the network devices that they should restart processing IOs.

Figure 5:
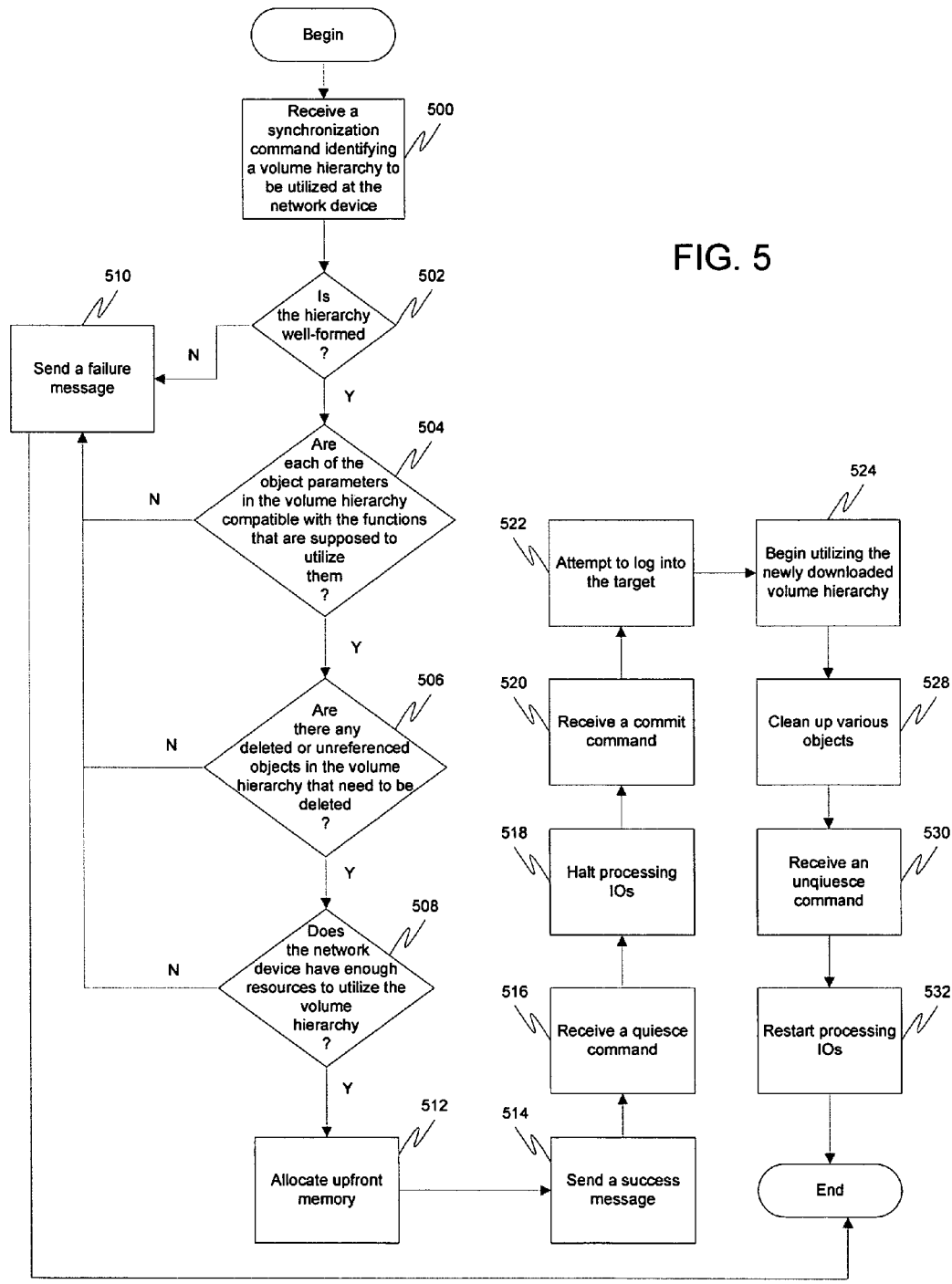
FIG. 5 is an example of a method for applying a volume hierarchy at a network device in a storage area network in accordance with an embodiment of the present invention.

FIG. 5 is an example of a method for applying a volume hierarchy at a network device in a storage area network in accordance with an embodiment of the present invention. This process may be executed at a switch or other network device in the storage area network. At 500, a synchronization command may be received identifying a volume hierarchy to be utilized at the network device. At 502, it may be determined if the hierarchy is well formed. This may include, for example, ensuring that there are no loops as well as checking to see if the number of objects in the hierarchy exceeds the maximum supported number of objects for the network device. At 504, each of the object parameters in the volume hierarchy may be checked to determine if they are compatible with the functions that are supposed to utilize them. This may include checking the object parameters for specific RAID functionality, for example. At 506, the device may check whether there are any deleted or unreferenced objects in the volume hierarchy that need to be deleted.

At 508, the system device may check to make sure that it has enough resources (e.g., memory) to utilize the volume hierarchy. If any of the tests from 502-508 fail, then at 510 a failure message may be sent.

At 512, upfront memory allocations may be performed to utilize the volume hierarchy. At 514, a success message may be sent.

In some embodiments, 500-506 above may be performed by a CPP while 508 and 512 may be performed by one or more DPPs corresponding to the CPP. In such embodiments, there may be an additional process that takes place between 506 and 508 where the necessary instructions and information are transferred from the CPP to the DPP(s).

At 516, a quiesce command may be received. In response to this, at 518, the network device may halt processing IOs. In embodiments where the network device comprises a CPP and one or more DPPs, this may include the CPP passing this command to the individual DPPs to halt processing IOs.

At 520, a commit command may be received. In response to this, at 522, the network device may attempt to log into the target. At 524, the network device may begin utilizing the newly downloaded volume hierarchy. This may include, for example, transferring the volume hierarchy from a temporary or shadow memory into an active memory, as well as, for example, deleting the old volume hierarchy. At 528, various objects may be cleaned up. This may include, for example, clearing the state information of the network device).

At 530, an unquiesce command may be received. At 532, processing of IOs by the network device may be restarted.

In some embodiments of the present invention, one or more of the executed steps described above may also include a return signal indicating whether the step executed successfully. The device receiving this return signal may then elect to abort the process (or part of the process) and try again prior to moving to the next step. For example, when a partner device sends a synchronization command to network devices in the storage area network, it may then wait until it receives "success" return signals from each of those devices prior to proceeding to the next step (such as quiesce or commit). If an error message is returned, the device may attempt to remedy the problem and try again. It should be noted that such actions may be fully configurable. For example in some embodiments an error message from a CPP in response to a synchronization command may result in resending the synchronization command to that CPP immediately, in other embodiments it may result in an attempt to address an underlying problem with the CPP (such as clearing up resources), while in even other embodiments it may result in simply ignoring the error message.

By maintaining the downloaded hierarchies in temporary or shadow memories (or otherwise holding them without making them active) until it is determined that all of them are ready to make the hierarchies active, embodiments of the present invention are able to address the challenges described earlier. The threat of data corruption may be minimized and consistency may be maintained throughout all the network devices in the SAN.

The use of the quiesce and unquiesce commands as described above minimizes the amount of down time in the network as IO processing is only stopped long enough to apply the new volume hierarchy, and is not delayed by the time it takes to download or test the volume hierarchy, for example.

Figure 6:
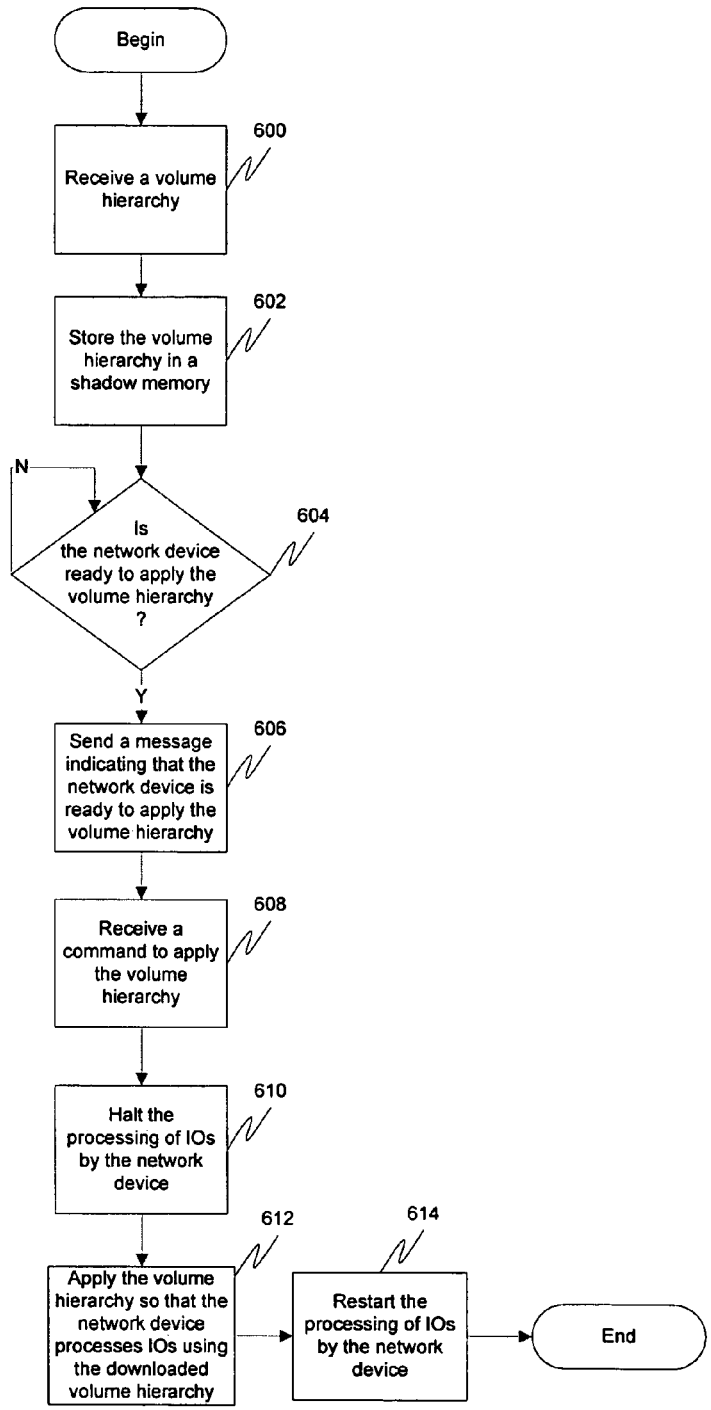
FIG. 6 is another example of a method for applying a volume hierarchy at a network device in a storage area network in accordance with an embodiment of the present invention.

FIG. 6 is another example of a method for applying a volume hierarchy at a network device in a storage area network in accordance with an embodiment of the present invention. The network device may be, for example, a switch. At 600, a volume hierarchy may be received. This receiving may occur simultaneously with or subsequent to receiving a synchronization command. For example, the volume hierarchy may be included as part of the synchronization command itself, or the volume hierarchy may follow in a subsequent message, or the synchronization command may simply indicate from where the network device should download the volume hierarchy and the network device follows up by downloading it later. At 602, the volume hierarchy may be stored in a shadow memory. At 604, it may be determined if the network device is ready to apply the volume hierarchy. This may include, for example, ensuring that each network device has completely received the volume hierarchy as well as ensuring that sanity checks have been successfully performed on the downloaded volume hierarchy. These sanity checks may include, for example, determining if the volume hierarchy is well-formed by checking for any loops in the hierarchy or if the hierarchy has more objects than a maximum allowable number of objects, checking each of the object parameters in the volume hierarchy to determine if they are compatible with the functions that are supposed to utilize them, and checking whether there are any deleted or unreferenced objects in the volume hierarchy that need to be deleted. When the network device is ready to apply the volume hierarchy, then at 606, it may send a message indicating that the network device is ready to apply the volume hierarchy. Later, at 608, a command to apply the volume hierarchy may be received. Presumably this command will be sent by a partner device when it is determined that all (or at least a majority of the) necessary network devices have sent messages indicating that they are ready to apply the volume hierarchy. At 610, the processing of IOs by the network device may be halted. At 612, the volume hierarchy may be applied so that the network device processes IOs using the downloaded volume hierarchy. This may include, for example, transferring the volume hierarchy from the shadow memory to an active memory. At 614, the processing of IOs by the network device may be restarted.

Figure 7:
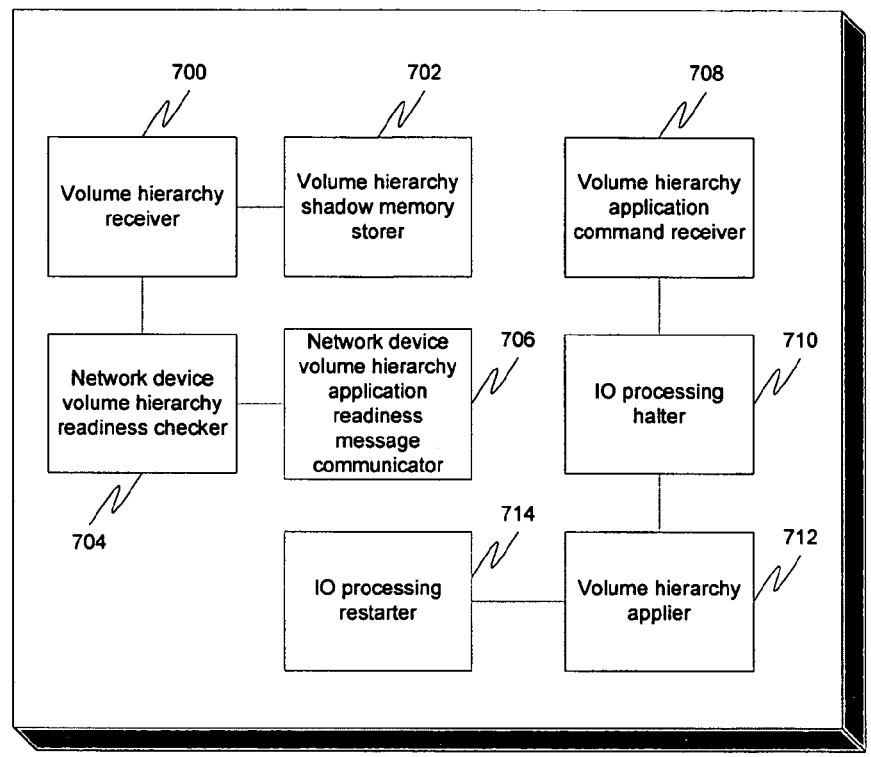
FIG. 7 is an example of an apparatus for applying a volume hierarchy at a network device in a storage area network in accordance with an embodiment of the present invention.

FIG. 7 is an example of an apparatus for applying a volume hierarchy at a network device in a storage area network in accordance with an embodiment of the present invention. The network device may be, for example, a switch. A volume hierarchy receiver 700 may receive a volume hierarchy. This receiving may occur simultaneously with or subsequent to receiving a synchronization command. For example, the volume hierarchy may be included as part of the synchronization command itself, or the volume hierarchy may follow in a subsequent message, or the synchronization command may simply indicate from where the network device should download the volume hierarchy, and the network device follows up by downloading it later. A volume hierarchy shadow memory storer 702 coupled to the volume hierarchy receiver 700 may store the volume hierarchy in a shadow memory. A network device volume hierarchy application readiness checker 704 coupled to the volume hierarchy receiver 700 may determine if the network device is ready to apply the volume hierarchy. This may include, for example, ensuring that each network device has completely received the volume hierarchy as well as ensuring that sanity checks have been successfully performed on the downloaded volume hierarchy. These sanity checks may include, for example, determining if the volume hierarchy is well-formed by checking for any loops in the hierarchy or if the hierarchy has more objects than a maximum allowable number of objects, checking each of the object parameters in the volume hierarchy to determine if they are compatible with the functions that are supposed to utilize them, and checking whether there are any deleted or unreferenced objects in the volume hierarchy that need to be deleted. When the network device is ready to apply the volume hierarchy, then a network device volume hierarchy application readiness message communicator 706 coupled to the network device volume hierarchy application readiness checker 704 may send a message indicating that the network device is ready to apply the volume hierarchy. Later, a volume hierarchy application command receiver 708 may receive a command to apply the volume hierarchy. Presumably this command will be sent by a partner device when it is determined that all (or at least a majority of the) necessary network devices have sent messages indicating that they are ready to apply the volume hierarchy. An IO processing halter 710 coupled to the volume hierarchy application command receiver 708 may halt the processing of IOs by the network device. A volume hierarchy applier 712 coupled to the IO processing halter may apply the volume hierarchy so that the network device processes IOs using the downloaded volume hierarchy. This may include, for example, transferring the volume hierarchy from the shadow memory to an active memory. An IO processing restarter 714 coupled to the volume hierarchy applier 712 may restart the processing of IOs by the network device.

As described above, embodiments of the present invention split the downloading of volume hierarchies to network devices in a SAN into two (or more) phases. In one phase, the volume hierarchies may be forwarded and stored in each of the network devices, but activation of the volume hierarchies may wait until a later phase, when it may have been determined that each of the network devices is ready to apply the new hierarchy. Also described above are embodiments wherein the network device applying the new volume hierarchy comprises a CPP and one or more DPPs. In some embodiments, the distribution of the volume hierarchies from the CPP to the DPPs may also occur via the two (or more) phases described above. For example, a partner device may utilize synchronization and commit transactions to help ensure that network devices do not apply new volume hierarchies until all the network devices are ready to do so. Likewise, within a network device, the CPP may utilize the equivalent of synchronization and commit transactions to help ensure that the DPPs do not apply new volume hierarchies until all the DPPs corresponding to the CPP are ready to do so. This may be called multi-level multi-phase volume hierarchy commits.

There may be many different permutations regarding the ordering of these multi-level phases. For example, in one embodiment, a synchronization command is received by the CPP and the CPP then sends a synchronization command to each of the corresponding DPPs, waits for messages from the DPPs indicating success, then sends a success message responding to the synchronization command. Subsequently, a commit command may be received by the CPP, and the CPP then sends a commit command to each of the DPPs. Alternatively, the CPPs may receive a synchronization command, determine whether it thinks the volume hierarchy can be applied, and send a success message responding to the synchronization command. Subsequently when a commit command is received, the CPP may then send a synchronization command to each of the corresponding DPPs, wait for messages from the DPPs indicating success, then send commit commands to each of the DPPs. In other words, it is possible that all the synchronization phases for all the levels are performed prior to any commit phases being performed, but it is also possible that each level undertakes its own set of synchronization and commit phases upon receipt of a commit command, as well as any combination of the above.

Figure 8:
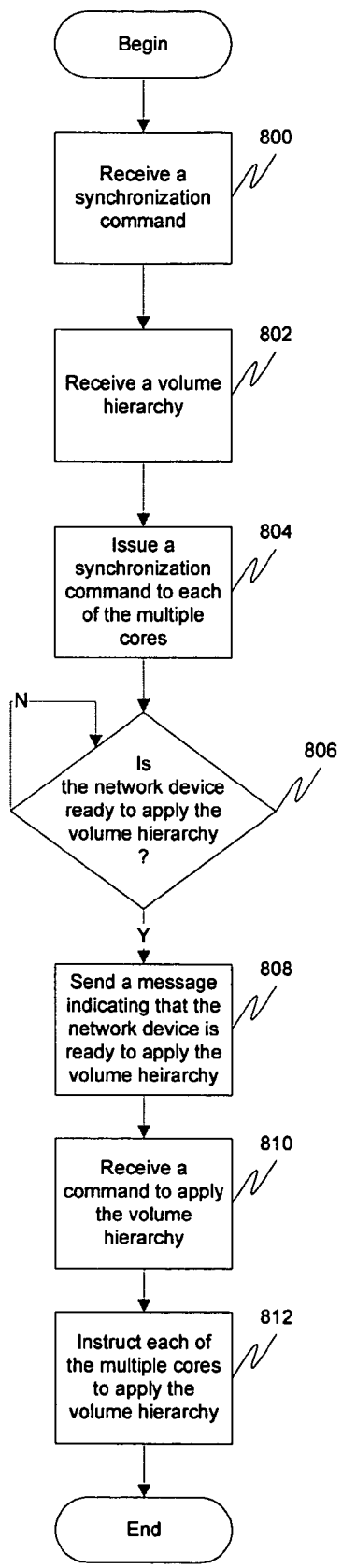
FIG. 8 is another example of a method for applying a volume hierarchy at a network device in a storage area network in accordance with an embodiment of the present invention.

FIG. 8 is another example of a method for applying a volume hierarchy at a network device in a storage area network in accordance with an embodiment of the present invention. The network device may be, for example, a switch having multiple cores. The method may be executed at, for example, a CPP within the switch. At 800, a synchronization command may be received. At 802, a volume hierarchy may be received. This receiving may occur simultaneously with or subsequent to receiving a synchronization command. For example, the volume hierarchy may be included as part of the synchronization command itself, or the volume hierarchy may follow in a subsequent message, or the synchronization command may simply indicate from where the network device should download the volume hierarchy and the network device follows up by downloading it later. At 804, a synchronization command may be issued to each of the multiple cores. This may include issuing a synchronization command to each of multiple data path processors (DPPs) corresponding to the network device. At 806, it may be determined if the network device is ready to apply the volume hierarchy. This may include, for example, ensuring that each network device has completely received the volume hierarchy as well as ensuring that sanity checks have been successfully performed on the downloaded volume hierarchy. These sanity checks may include, for example, determining if the volume hierarchy is well-formed by checking for any loops in the hierarchy or if the hierarchy has more objects than a maximum allowable number of objects, checking each of the object parameters in the volume hierarchy to determine if they are compatible with the functions that are supposed to utilize them, and checking whether there are any deleted or unreferenced objects in the volume hierarchy that need to be deleted. It also may include waiting until success messages are received from each of the cores in response to the synchronization commands. When the network device is ready to apply the volume hierarchy, then at 808, it may send a message indicating that the network device is ready to apply the volume hierarchy. Later, at 810, a command to apply the volume hierarchy may be received. Presumably this command will be sent by a partner device when it is determined that all (or at least a majority of the) necessary network devices have sent messages indicating that they are ready to apply the volume hierarchy. At 812, each of the multiple cores may be instructed to apply the volume hierarchy.

Figure 9:
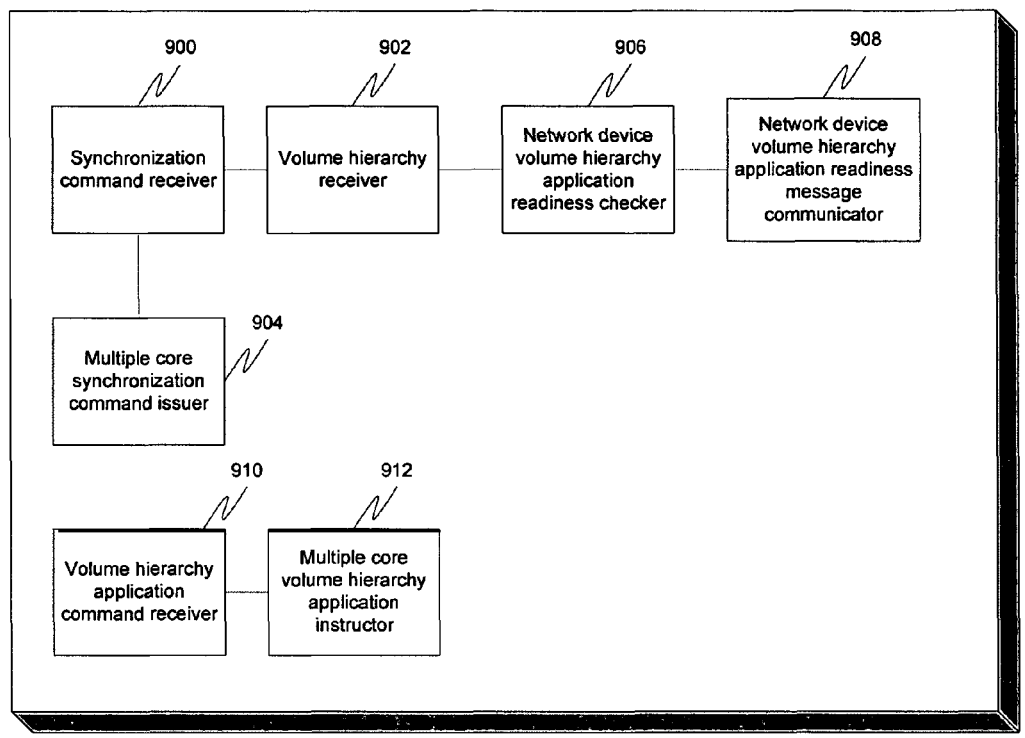
FIG. 9 is another example of an apparatus for applying a volume hierarchy at a network device in a storage area network in accordance with an embodiment of the present invention.

FIG. 9 is another example of an apparatus for applying a volume hierarchy at a network device in a storage area network in accordance with an embodiment of the present invention. The network device may be, for example, a switch having multiple cores. The apparatus may be, for example, a CPP within the switch. A synchronization command receiver 900 may receive a synchronization command. A volume hierarchy receiver 902 coupled to the synchronization command receiver 900 may receive a volume hierarchy. This receiving may occur simultaneously with or subsequent to receiving a synchronization command. For example, the volume hierarchy may be included as part of the synchronization command itself, or the volume hierarchy may follow in a subsequent message, or the synchronization command may simply indicate from where the network device should download the volume hierarchy and the network device follows up by downloading it later. A multiple core synchronization command issuer 904 coupled to the synchronization command receiver 900 may issue a synchronization command to each of the multiple cores. This may include issuing a synchronization command to each of multiple data path processors (DPPs) corresponding to the network device. A network device volume hierarchy application readiness checker 906 coupled to the volume hierarchy receiver 902 may determine if the network device is ready to apply the volume hierarchy. This may include, for example, ensuring that each network device has completely received the volume hierarchy as well as ensuring that sanity checks have been successfully performed on the downloaded volume hierarchy. These sanity checks may include, for example, determining if the volume hierarchy is well-formed by checking for any loops in the hierarchy or if the hierarchy has more objects than a maximum allowable number of objects, checking each of the object parameters in the volume hierarchy to determine if they are compatible with the functions that are supposed to utilize them, and checking whether there are any deleted or unreferenced objects in the volume hierarchy that need to be deleted. It also may include waiting until success messages are received from each of the cores in response to the synchronization commands. When the network device is ready to apply the volume hierarchy, then a network device volume hierarchy application readiness message communicator 908 coupled to the network device volume hierarchy application readiness checker 906 may send a message indicating that the network device is ready to apply the volume hierarchy. Later, a volume hierarchy application command receiver 910 may receive a command to apply the volume hierarchy. Presumably this command will be sent by a partner device when it is determined that all (or at least a majority of the) necessary network devices have sent messages indicating that they are ready to apply the volume hierarchy. A multiple core volume hierarchy application instructor 912 coupled to the volume hierarchy application command receiver 910 may instruct each of the multiple cores to apply the volume hierarchy.

It should also be noted that the terminology of the commands described above should be viewed broadly. In other words, terms like synchronization and commit should be interpreted to broadly refer to commands that perform the functions of downloading and activating, respectively, and should not be limited to any particular commands in any particular programming language or protocol. Likewise, the terms quiesce and acquiesce should be interpreted to broadly refer to commands that perform the function of halting 10 processing and restarting 10 processing, respectively The volume hierarchy may be any data that describes the organization of a volume. As an example, the following volume definition may be used:

```
<Volume>::=<RAID>[<Volume>]+|<RAID>[<Extent>]+
|concat [<Volume>]+|concat [<Extent>]+
<RAID>::=raid0|raid1
<Extent>::=vlba, len, plba, <VDisk>
<XMap>::=[<XMEntry>]+
<XMEntry>::=start–lba,    length,    <ReadParm>,
<WriteParm>
<ReadParm>::=lbaOffsetInVol <AccessAttr><Volume>
<WriteParm>::=lbaOffsetInVol <AccessAttr><Volume>
<AccessAttr>::
=ALLOW|FAULT|HOLD|CONTROL|REJECT
<VDisk>::=<PathAttr>[pathWeight <Path>]+
<PathAttr>::=[PATH_RR|PATH_STICKY]
<Path>::=[portWWN, Lun]+
```

Volume may be a set of volumes connected by a RAID function, or a concatenation of volumes, or a concatenation of extents.

Extent may be defined as a contiguous set of blocks on a VDisk.

Concatenation may be an aggregation of extents or an aggregation of volumes.

An Xmap may be a set of xmap-entries. A xmap-entry is a variable size LBA range (a region) with a set of attributes. These attributes allow the control path to control the fastpath, such as instructing the fast path to process IO requests that fall within that region, to notify the control path when it gets an IO within that region and wait for a handshake indication from the control path prior to processing.

A VDisk may be a LUN on a multi-ported SCSI target device. Included in the description may be all paths to the LUN on the multi-ported target device.

In order to export a volume for external access (via a SAN), a volume may mapped into the SCSI/FCP model as follows:
```
<VT>::=nWWN, pWWN, [<VLUN>]+, [<LunMap>]*
<VLUN>::=vlunId, <XMap>
<LunMap>::=[initiatorWWN]+,   [vluNum,   mappedV-
luNum]+
```
Virtual Objects may include
VDisk
Extent
Volume
XMap
Virtual Target (VT)

Each object may contain an identifier and a set of fields specific to the object. In addition to the virtualization object are associations between the virtualization objects. One such association is referred to as a VLUN. A VLUN associates a volume an Xmap object with a VT along with an assigned VLUN number. Because an Xmap object points to a volume, a volume is effectively associated with the VT. Host based LUN Maps are another kind of association. Here, depending on the host, a VLUN number in the default VLUN list may be reassigned a different VLUN number.

Each object may be identified by a 64 bit identifier. The format of the identifier may be defined by the partner software. The identifier can have local scope i.e. is unique within a linecard on an MDS switch, or global, i.e., is unique across linecards and switches. The partner software may be responsible for defining the scope of an identifier.

A VDisk object description may include:
an Object Identifier
pWWN of the target port of a multi-ported SCSI target device.
LUN number on that target port for Logical Disk Unit on the multi-ported SCSI target device.
The control path (partner software) can discover the fact that a Logical Disk Unit on a SCSI Target Device may be exported via multiple target ports on that SCSI Target Device. The list of (target-port, LUN) tuples for a Logical Disk Unit may be contained in the VDisk. The list of tuples may translate to multiple paths between the fast path virtual initiator and the target-port. The multipath information may include Active-Active paths; Active-Passive paths that failover implicitly; and Active-Passive paths that need explicit failover mechanisms.

When a volume's V2P table is downloaded to the fast path, because a volume contains extents, and because extents in turn point to vdisks, the V2P table may include vdisk path information.

An extent object description may include:
a object identifier.
object identifier of the VDisk on which the backing storage for this extent was allocated.
starting LBA and number of LBAs on the VDisk.
block size.
position of the extent (LBA offset) in the parent volume.
Extent objects are synonymous with the backing storage needed for a volume. One or more extent objects may be concatenated to cover the entire logical block address space exported by a volume. Extent objects may not also be used in conjunction with RAID0 or RAID1 layout functions.

A volume object description may contain:
an object identifier.
geometry of the volume; which includes size of the volume, grouping function (type of RAID or concatenation), number of grouping elements and object identifiers of the group elements. Each grouping may have its own sub-block that contains further details such as stripe unit size for RAID0.
pWWN of the volume
position of volume (LBA offset) in parent volume; if volume is a "concatenation element" of another top level volume.
Other symbolic strings such as user-defined name, comments etc.

A volume object may be synonymous with a LUN exported by a virtual target to an initiator. A volume may be a concatenation/RAID function of extents or it may be made up of other volumes. When a volume is made up of other volumes, it may have a RAID type associated with it or it may be a concatenation of volumes.

Figure 10:
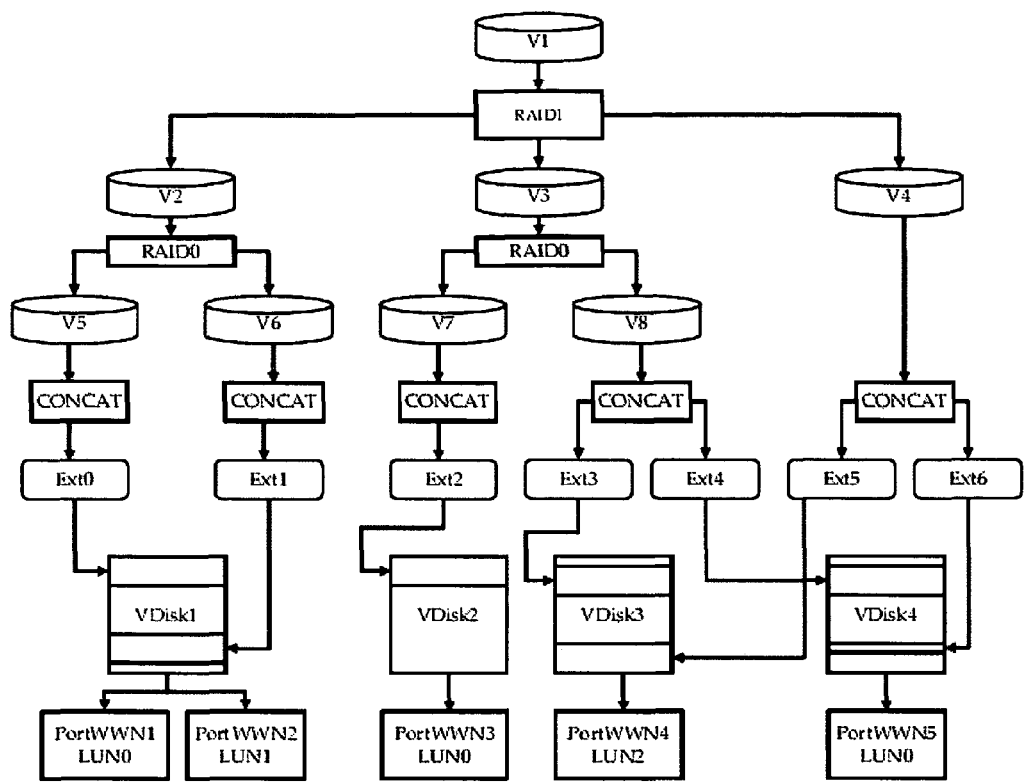
FIG. 10 is an example of a volume description in accordance with an embodiment of the present invention.

In one embodiment, a volume is described a layer at a time. ISAPI combines them together into a collapsed structure for use by the fast path. For example, the volume description of V1 in FIG. 10 may be built by:
(1) Describing each extent that is used
(2) Describing each volume in terms of its components and the function (RAID or concatenation) applied to these components.

More specifically, V2 may be described as a RAID0 volume composed of two volumes V5 and V6; the RAID0 properties such as stripe size may also be specified. However, when describing V2, V5 and V6, the volumes may only be referenced by their object IDs and are not themselves described.

The XMap object may keeps track of regions of a VLU. The object description may include:
an object identifier.
a set of regions. A region is described via a start LBA, number of LBAs, attributes for READ IOs, a volume layout for READ IOs, attributes for WRITE IOs and a volume layout for WRITE IOs.

A VT object description may contain:
port WWN and node WWN of the VT.

VLUN list
LUN maps, if any
Symbolic strings such as user-defined name, comments etc.

A virtual target may be analogous to a target port of a multi-ported SCSI target device in the physical world. A virtual target may have port WWN and a node WWN associated with it. Every virtual target may have a unique port WWN associated with it. Multiple virtual targets can have the same node WWN. When multiple virtual targets have the same node WWN, this set of VTs is analogous to the enclosure object in the physical world. Additionally, associated with a VT may be one or more VLUNs. A volume may be "made visible" to an initiator by zoning the initiator and VT with VLUNs together. VLUNs may be created by associating an XMAP object with a VLUN identifier on a VT. Because the XMAP object points to the volume, the volume is effectively exposed as a VLUN.

In addition to the above description of the relationship of the VT object with other virtualization object, it should also be noted that in the context of a switch based virtualization implementations, a VT may also have some Fibre Channel notions tagged to it. One such notion is that of an N_PORT. Just like a physical target has an N_PORT registered in the Fibre Channel Name Server database, a VT may have an N_PORT registered in the Fibre Channel Name Server database. Because of the virtual element, it may be referred to as an NV_PORT. Additionally, from an implementation perspective IOs sent to a VT are processed in a DPP. Consequently, the NVPORT (synonymous with VT) may be associated with a DPP.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method comprising:
   receiving a volume hierarchy at a network device in a storage area network;
   sending by the network device a message to at least one other network device, the message indicating that the network device is ready to apply the volume hierarchy when the network device is ready to apply the volume hierarchy;
   receiving a command at the network device to apply the volume hierarchy, wherein the command indicates that other network devices that have received the volume hierarchy are ready to apply the volume hierarchy, wherein the command is received from a second network device after receiving both 1) the message indicating that the network device is ready to apply the volume hierarchy and 2) messages from at least a majority of the other network devices that have received the volume hierarchy, wherein the messages indicate that the at least a majority of the other network devices are ready to apply the volume hierarchy; and
   after receiving the command, applying the volume hierarchy at the network device so that the network device processes input/outputs (IOs) using the volume hierarchy.

2. The method of claim 1, further comprising, after receiving the volume hierarchy but before sending a message indicating that the network device is ready to apply the volume hierarchy, storing the volume hierarchy by the network device in a shadow memory.

3. The method of claim 2, wherein applying the volume hierarchy includes transferring the volume hierarchy from the shadow memory to an active memory.

4. The method of claim 1, wherein the network device is a switch.

5. The method of claim 4, wherein the other network devices are switches.

6. The method of claim 1, further comprising halting the processing of IOs prior to the applying the volume hierarchy.

7. The method of claim 6, further comprising restarting the processing of IOs after the applying the volume hierarchy.

8. The method of claim 1, wherein the receiving a volume hierarchy occurs simultaneously with or subsequent to receiving a synchronization command.

9. The method of claim 1, further comprising executing one or more tests.

10. The method of claim 9, wherein one of the tests includes determining if the volume hierarchy is well-formed.

11. The method of claim 10, wherein the determining if the volume hierarchy is well-formed includes determining if there are any loops in the volume hierarchy.

12. The method of claim 9, wherein one of the tests includes checking each of the object parameters in the volume hierarchy to determine if they are compatible with the functions that are supposed to utilize them.

13. The method of claim 9, wherein one of the tests includes checking whether there are any deleted or unreferred objects in the volume hierarchy that need to be deleted.

14. The method of claim 1, wherein the command received at the network device to apply the volume hierarchy indicates that the network device is to begin using the volume hierarchy in lieu of another volume hierarchy that the network device had been using.

15. The method of claim 14, wherein applying the volume hierarchy at the network device comprises replacing the another volume hierarchy with the volume hierarchy.

16. The method of claim 14, wherein applying the volume hierarchy at the network device comprises deleting the another volume hierarchy.

17. The method of claim 1, wherein the command received at the network device to apply the volume hierarchy indicates that at least a majority of network devices that have received the volume hierarchy have sent messages indicating that they are ready to apply the volume hierarchy.

18. The method of claim 1, wherein the command indicates that the second network device has received messages from the other network devices, the messages indicating that the other network devices are ready to apply the volume hierarchy.

19. The method of claim 1, wherein the command indicates that at least a majority of a set of network devices have sent messages indicating that they are ready to apply the volume hierarchy.

20. The method of claim 19, wherein the set of network devices includes the network device and the one or more other network devices.

21. The method of claim 19, wherein the set of network devices have received the volume hierarchy.

22. The method of claim 1, wherein the command indicates that at least a majority of the other network devices that have received the volume hierarchy have sent messages indicating that they are ready to apply the volume hierarchy.

23. The method of claim 1, wherein the command is received from a second network device, wherein the command indicates that each of the other network devices that have received the volume hierarchy have sent messages indicating that they are ready to apply the volume hierarchy.

24. The method of claim 1, wherein the volume hierarchy describes a virtual storage device.

25. The method of claim 24, wherein the virtual storage device indicates how information is physically stored among a plurality of storage devices.

26. The method of claim 25, wherein the plurality of storage devices are separate from the network device.

27. The method of claim 1, wherein the network device does not include a storage device.

28. The method of claim 1, wherein the network device and the other network devices are intermediate devices.

29. The method of claim 1, wherein the volume hierarchy pertains to a volume that is shared by the network device and the other network devices.

30. The method of claim 1, wherein the network device processes IOs by communicating with storage devices indicated by the volume hierarchy.

31. A method comprising:
receiving a synchronization command at a network device in a storage area network, the network device having multiple cores;
receiving at the network device a volume hierarchy during or after the receiving of the synchronization command;
issuing by the network device a synchronization command to each of the multiple cores;
sending a message by the network device to at least one other network device, the message indicating that the network device is ready to apply the volume hierarchy when the network device is ready to apply the volume hierarchy;
receiving a command at the network device to apply the volume hierarchy, wherein the command indicates that other network devices that have received the volume hierarchy are ready to apply the volume hierarchy, wherein the command is received from a second network device after receiving both 1) the message indicating that the network device is ready to apply the volume hierarchy and 2) messages from at least a majority of the other network devices that have received the volume hierarchy, wherein the messages indicate that the at least a majority of the other network devices are ready to apply the volume hierarchy; and
after receiving the command, instructing by the network device each of the multiple cores to apply the volume hierarchy.

32. The method of claim 31, wherein the issuing a synchronization command includes issuing a synchronization command by a control path processor (CPP) to each of multiple data path processors (DPPs) corresponding to the network device.

33. The method of claim 31, wherein the method is performed at a switch.

34. The method of claim 33, wherein the method is performed at a control path processor (CPP) in the switch.

35. An apparatus comprising:
at least one processor; and
a memory, the at least one processor or the memory being configured for:
receiving a volume hierarchy at a network device in a storage area network;
sending a message by the network device to at least one other network device, the message indicating that the network device is ready to apply the volume hierarchy when the network device is ready to apply the volume hierarchy;
receiving a command at the network device to apply the volume hierarchy, wherein the command indicates that other network devices that have received the volume hierarchy are ready to apply the volume hierarchy, wherein the command is received from a second network device after receiving both 1) the message indicating that the network device is ready to apply the volume hierarchy and 2) messages from at least a majority of the other network devices that have received the volume hierarchy, wherein the messages indicate that the at least a majority of the other network devices are ready to apply the volume hierarchy; and
after receiving the command, applying the volume hierarchy at the network device so that the network device processes input/outputs (IOs) using the volume hierarchy.

36. An apparatus comprising:
at least one processor; and
a memory, the at least one processor or the memory being configured for:
receiving a synchronization command at a network device in a storage area network, the network device having multiple cores;
receiving a volume hierarchy at the network device during or after the receiving of the synchronization command;
issuing a synchronization command by the network device to each of the multiple cores;
sending a message by the network device to at least one other network device, the message indicating that the network device is ready to apply the volume hierarchy when the network device is ready to apply the volume hierarchy;
receiving a command at the network device to apply the volume hierarchy, wherein the command indicates that other network devices that have received the volume hierarchy are ready to apply the volume hierarchy, wherein the command is received from a second network device after receiving both 1) the message indicating that the network device is ready to apply the volume hierarchy and 2) messages from at least a majority of the other network devices that have received the volume hierarchy, wherein the messages indicate that the at least a majority of the other network devices are ready to apply the volume hierarchy; and
after receiving the command, instructing by the network device each of the multiple cores to apply the volume hierarchy.

37. An apparatus comprising:
at least one processor; and
a memory, the at least one processor or the memory being configured to provide:
a volume hierarchy receiver;
a network device volume hierarchy application readiness checker coupled to the volume hierarchy receiver;
a network device volume hierarchy application readiness message communicator coupled to the network device volume hierarchy application readiness checker configured for sending a message to at least one other network device, the message indicating that the network device is ready to apply the volume hierarchy when the network device is ready to apply the volume hierarchy;

a volume hierarchy application command receiver configured to receive a command to apply the volume hierarchy, wherein the command indicates that other network devices that have received the volume hierarchy have sent messages indicating that they are ready to apply the volume hierarchy, wherein the command is received from a second network device after receiving both 1) the message indicating that the network device is ready to apply the volume hierarchy and 2) messages from at least a majority of the other network devices that have received the volume hierarchy, wherein the messages indicate that the at least a majority of the other network devices are ready to apply the volume hierarchy; and a volume hierarchy applier coupled to the volume hierarchy application command receiver and configured to apply the volume hierarchy after the command is received.

38. An apparatus comprising:

at least one processor; and a memory storing thereon:

a synchronization command receiver;

a volume hierarchy receiver coupled to or contained within the synchronization command receiver;

a multiple core synchronization command issuer coupled to the synchronization command receiver;

a network device volume hierarchy application readiness checker coupled to the volume hierarchy receiver;

a network device volume hierarchy application readiness message communicator coupled to the network device volume hierarchy application readiness checker configured for sending a message to at least one other network device, the message indicating that the network device is ready to apply the volume hierarchy when the network device is ready to apply the volume hierarchy;

a volume hierarchy application command receiver configured to receive a command to apply the volume hierarchy, wherein the command indicates that other network devices that have received the volume hierarchy have sent messages indicating that they are ready to apply the volume hierarchy, wherein the command is received from a second network device after receiving both 1) the message indicating that the network device is ready to apply the volume hierarchy and 2) messages from at least a majority of the other network devices that have received the volume hierarchy, wherein the messages indicate that the at least a majority of the other network devices are ready to apply the volume hierarchy; and a multiple core volume hierarchy application instructor coupled to the volume hierarchy application command receiver that is configured to, after the command is received, instruct multiple cores to apply the volume hierarchy.

\* \* \* \* \*